United States Patent
Liao et al.

(10) Patent No.: US 9,166,647 B2
(45) Date of Patent: Oct. 20, 2015

(54) EXPANDABLE DEVICE FOR WIRELESS AUDIO INPUT

(71) Applicant: Generalplus Technology Inc., Hsinchu (TW)

(72) Inventors: Tung-Tsai Liao, Hsinchu (TW); Li Sheng Lo, Zhubei (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 18 days.

(21) Appl. No.: 14/087,492

(22) Filed: Nov. 22, 2013

(65) Prior Publication Data
US 2015/0004921 A1    Jan. 1, 2015

(30) Foreign Application Priority Data
Jun. 28, 2013  (TW) .............................. 102123230 U

(51) Int. Cl.
*H04B 1/38*    (2015.01)
*H04B 1/44*    (2006.01)

(52) U.S. Cl.
CPC ........................................ *H04B 1/44* (2013.01)

(58) Field of Classification Search
CPC ... H04R 2420/03; H04R 2420/09; H04R 5/04
See application file for complete search history.

(56) References Cited

U.S. PATENT DOCUMENTS

| | | | |
|---|---|---|---|
| 2007/0003073 A1* | 1/2007 | Iriarte | 381/77 |
| 2008/0139025 A1* | 6/2008 | Becker | 439/164 |
| 2010/0020983 A1* | 1/2010 | Waites | 381/79 |
| 2010/0263603 A1* | 10/2010 | Baron | 119/850 |
| 2013/0108072 A1* | 5/2013 | Chen | 381/77 |
| 2013/0315416 A1* | 11/2013 | Nakayama | 381/77 |
| 2014/0161274 A1* | 6/2014 | Singamsetty et al. | 381/74 |

* cited by examiner

*Primary Examiner* — David Bilodeau
(74) *Attorney, Agent, or Firm* — Muncy, Geissler, Olds & Lowe, P.C.

(57) ABSTRACT

An expandable device for wireless audio input is provided in the present invention. The expandable device for wireless audio input is compatible with an audio provider, wherein the audio provider is used for converting an audio to a wireless signal to output the wireless signal. The expandable device for wireless audio input is used for outputting an audio signal to an audio output device, wherein, the audio output device includes a first audio jack. The expandable device for wireless audio input includes a first audio jack plug, a wireless receiver and a second audio jack. The first audio jack plug is used for outputting a first audio signal. The wireless receiver receives the wireless signal outputting from the audio provider and converts the wireless signal into the first audio signal to transmit to the first audio jack plug. When a second audio signal is inputted from the second audio jack plug, the second audio signal is provided to the first audio jack plug.

7 Claims, 3 Drawing Sheets

EXPANDABLE DEVICE FOR WIRELESS AUDIO INPUT

This application claims priority of No. 102123230 filed in Taiwan R.O.C. on Jun. 28, 2013 under 35 USC 119, the entire content of which is hereby incorporated by reference.

BACKGROUND OF THE INVENTION

1. Field of the Invention

The invention relates to a technology for audio input interface, and more particularly to an expandable device for wireless audio input.

2. Related Art

With the progress of the technology, the electronic technology has been progressed from the earliest vacuum tube and transistor to the integrated circuit chip, which has the quite wide applications. Thus, the electronic products have gradually become the indispensable essentials in the life of the modern human beings. At present, electrical product, such as DVD player, audio amplifier, and so on, has functions of audio output and audio play. In addition, some electrical product also has function for playing the inputted external audio signal, that is, the speaker of the electrical product is adopted for producing sound in response to the external audio signal input.

Electrical product with function for playing the external audio signal may include an audio process module, a control module, an audio amplifier, an audio I/O module and an audio playback device. When playing the music is required, the control module is operated to generate a control signal. The audio process module responds the control signal to decode the audio file to output a decoded audio signal, and the audio amplifier amplifies the decoded audio signal to output a driving signal adapted for driving the audio playback device, such that the audio playback device plays the music carrier by the decoded audio signal. The audio I/O module couples to the audio process module and the audio amplifier for outputting audio signal outputted from the audio process module.

When a user wants to play the external audio signal input through the electrical product, the audio I/O module can receives the external audio signal input and transmits the external audio signal input to the audio amplifier to amplify the external audio signal input to obtain the driving signal for driving the audio playback device. However, the number of the external audio jack of the electrical product is limited, and one external audio jack can only receive one external audio signal input from the external device. When pluralities of external audio signal inputs is required to be inputted in the electrical product, the first issue that the user meets is the lack of the audio jack.

SUMMARY OF THE INVENTION

In view of the above-identified problems, it is therefore an object of the invention to provide an expandable device for wireless audio input. The expandable device for wireless audio input has extra audio jack to expand the audio jack of the audio player. Thus, when another device needs to use the original audio jack to input an audio to the audio player, the device still can use the extra audio jack on the expandable device for audio input.

To achieve the above-identified object, the invention provides an expandable device for wireless audio input, for outputting an audio signal to an audio output device, wherein the audio output device comprises a first audio jack, and the expandable device for wireless audio input comprises a first audio jack plug, a wireless receiver and a second audio jack. The first audio jack plug is for outputting a first audio signal. The wireless receiver is coupled to the first audio jack plug for converting a wireless signal into the first audio signal, and transmitting the first audio signal to the first audio jack plug. The second audio jack is coupled to the first audio jack plug. When there in a second audio signal inputted from the second audio jack, the second audio jack provides the second audio signal to the first audio jack plug. The expandable device for wireless audio input is compatible with an audio provider. The audio provider is used for converting an audio into the wireless signal, and transmitting the wireless signal to the wireless receiver.

According to a preferred embodiment of the present invention, the audio provider comprises an electronic musical instrument. When a user plays the electronic musical instrument, the electronic musical instrument converts a music which user plays into an electrical signal, and converts the electrical signal into the wireless signal. In another preferred embodiment, the audio provider comprises a wireless microphone, wherein, when the wireless microphone receives the audio, the wireless microphone converts the received audio into the wireless signal. In a preferred embodiment, the expandable device further comprises a mixer, coupled to the first audio jack plug, the wireless receiver and the second audio jack, for mixing the second audio signal inputted from the second audio jack and the first audio signal from the wireless receiver for audio mixing. In a preferred embodiment, the expandable device further comprises a switching circuit, coupled to the mixer, wherein the mixer is enabled when the switching circuit is turned on, and the mixer is disabled when the switching circuit is turned off. In a preferred embodiment, the switching circuit is turned on when a second audio jack plug is inserted to the second audio jack. In a preferred embodiment, the expandable device further comprises a battery for providing a power to the wireless receiver.

The spirit of the present invention is to provide an extra audio jack on the expandable device for wireless audio input to expand the audio jack of the audio player. Thus, when another device needs to use the original audio jack to input an audio to the audio player, the device still can use the audio jack on the expandable device for audio input. Accordingly, expandable device for wireless audio input can be used for unlimitedly expanding the audio input. In other words, if there is a plurality of expandable devices, they can serially connect to the audio player, and the number of the audio jack of the audio player does not need be taken into account.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
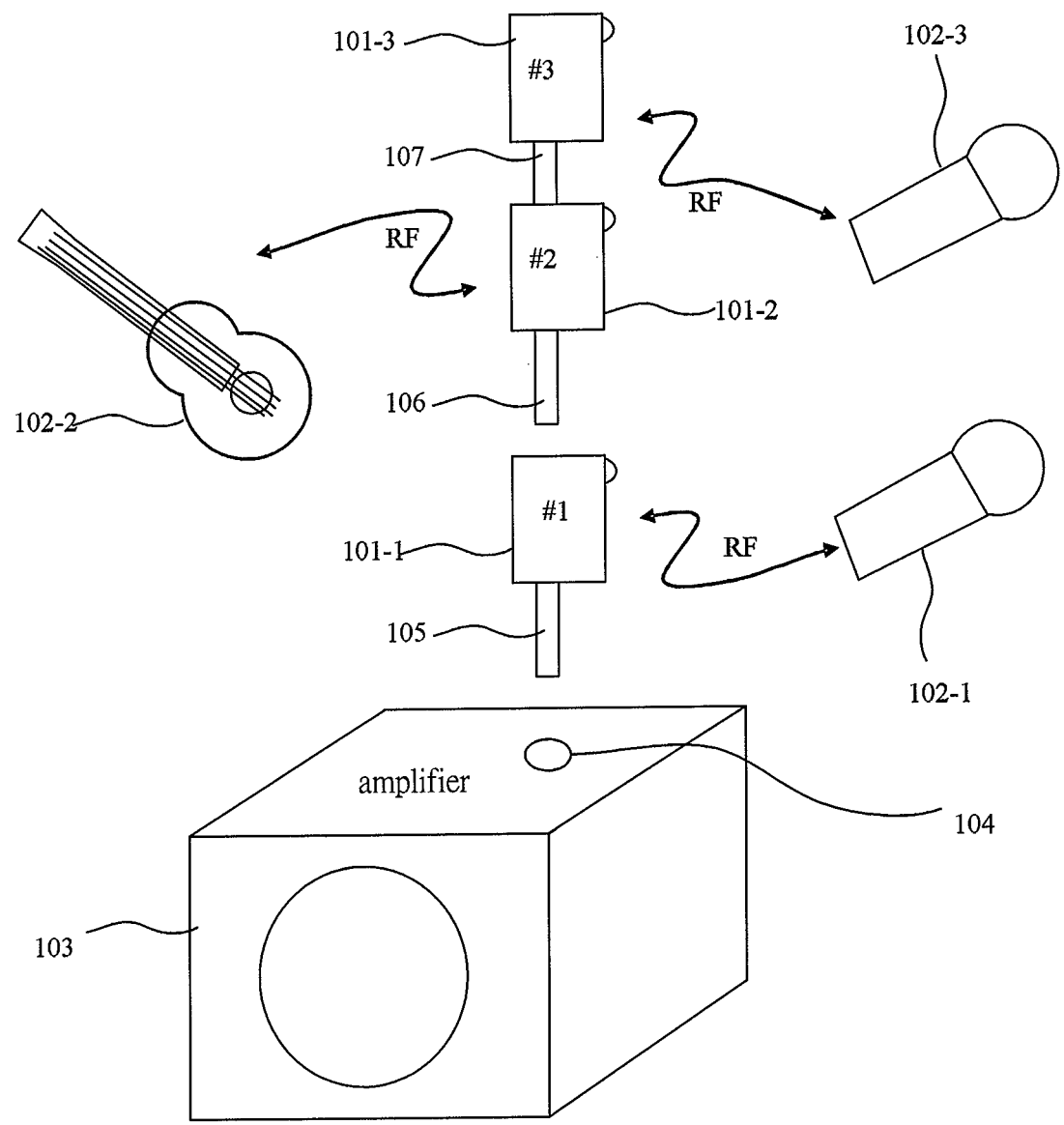
FIG. 1 illustrates a diagram depicting an expandable device for wireless audio input according to a preferred embodiment of the present invention.

FIG. 1 illustrates a diagram depicting an expandable device for wireless audio input according to a preferred embodiment of the present invention. Referring to FIG. 1, in this embodiment, it illustrates a plurality of expandable devices for wireless audio input 101-1, 101-2 and 101-3 and a plurality of wireless audio providers 102-1, 102-2 and 102-3 respectively corresponding to wireless audio input 101-1, 101-2 and 101-3. In addition, in this embodiment, an audio player 103 is illustrated. The audio player 103 in this embodiment merely includes one audio jack 104. In this embodiment, the wireless audio providers 102-1 and 102-3 are wireless microphones, and the wireless audio provider 102-2 is a wireless electronic musical instrument. Moreover, the expandable device for wireless audio input 101-1 is corresponding to the wireless microphone 102-1, the wireless audio input 101-2 is corresponding to the wireless electronic musical instrument 102-2, and the expandable device for wireless audio input 101-3 is corresponding to the wireless microphone 102-3.

In the present embodiment, the audio jack plug 105 of the expandable device 101-1 inserts into the audio jack 104 of the audio player 103. Further, the audio jack plug 106 of the expandable device 101-2 inserts into the audio jack of the expandable device 101-1, and the audio jack plug 107 of the expandable device 101-3 inserts into the audio jack of the expandable device 101-2. Since the expandable devices 101-1, 101-2 and 101-3 is designed with an extra audio jack, unlimitedly expanding the audio input can be performed, even though the audio player 103 only have one audio jack 104.

Figure 2:
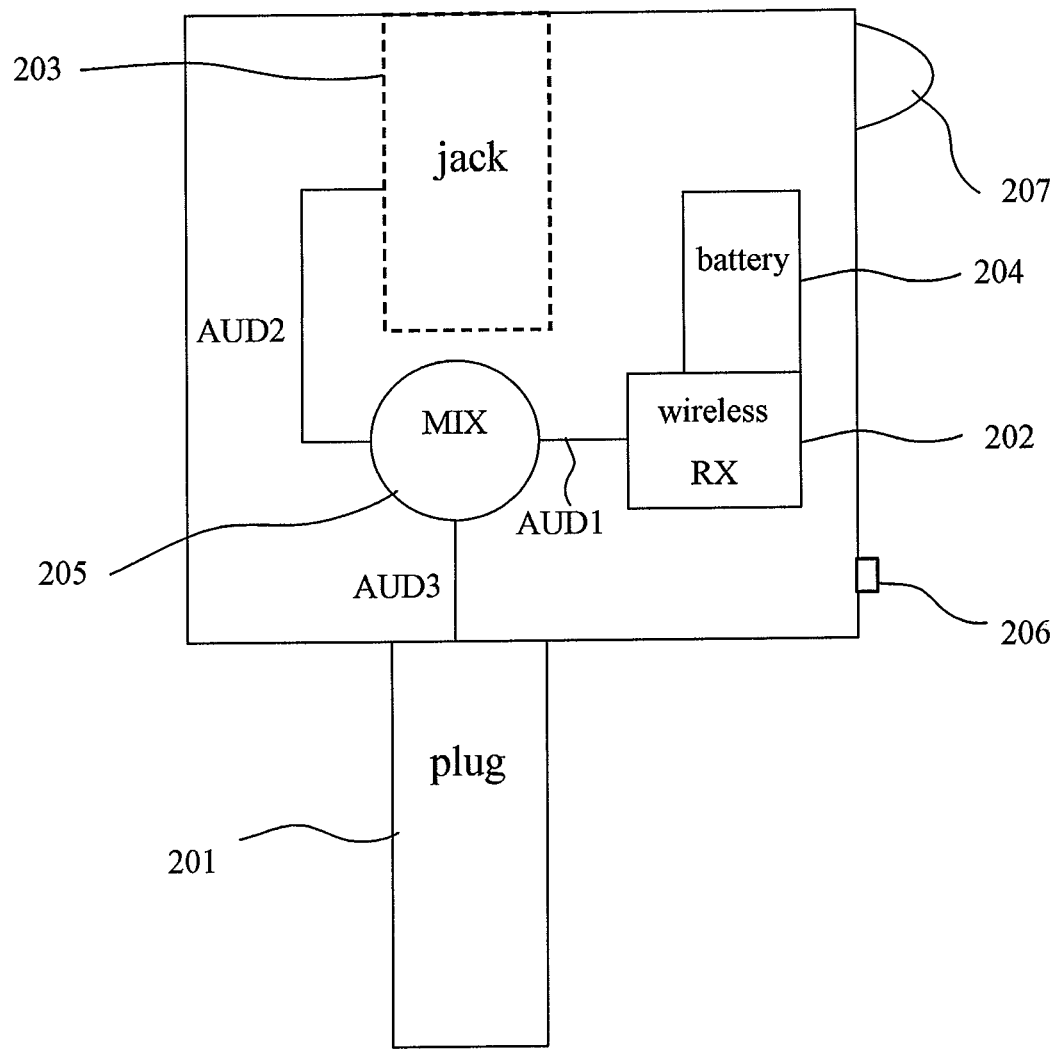
FIG. 2 illustrates a circuit block diagram depicting an expandable device for wireless audio input according to a preferred embodiment of the present invention.

FIG. 2 illustrates a circuit block diagram depicting an expandable device for wireless audio input 101-1, 101-2 or 101-3 according to a preferred embodiment of the present invention. Referring to FIG. 2, the expandable device includes an audio jack plug 201, a wireless receiver 202, an audio jack 203, a battery 204 and a mixer 205. The battery 204 is used for providing the power required by the internal circuit of the expandable device, such as the wireless receiver 202 and the mixer 205. The wireless receiver 202 is used for receiving the wireless signal provided from external wireless audio provider, such as a wireless microphone or a wireless electronic musical instrument, and converting the wireless signal into an audio signal AUD1. In addition, assuming an audio signal AUD2 is inputted to the audio jack 203, the mixer 205 would mix the audio signal AUD1 and the audio signal AUD2, and output a mixed signal AUD3 to the audio jack plug 201.

Since it may no audio inputted to the audio jack 203, also, user may not need an expansion. However, when there is no audio inputted to the audio jack 203 and the mixer is turned on, the mixer 205 may mix the noise and the audio signal AUD1, and it may reduce the sound quality. In this embodiment, the expandable device for wireless audio input also includes a switching circuit 206. The switching circuit 206 is used to turn on or off the mixer 205. When the audio signal AUD2 is inputted to the audio jack 203, user can turn on the switching circuit 206 to enable the mixer 205 for audio mixing. When there is no audio inputted to the audio plug 203, user can turn off the switching circuit 206 to disable the mixer 205 such that the noise would not affect the audio signal AUD1.

According to FIG. 1, the audio player 103 serially connects the expandable devices 101-1, 101-2 and 101-3. However, there is no audio inputted from the audio jack of the top expandable devices 101-3. Therefore, user can turn off the switching circuit 206 of the expandable devices 101-3 to disable the mixer 205 of the expandable devices 101-3.

In this embodiment, the expandable devices for wireless audio input also includes a controller 207, the controller 207 can perform the volume control or the frequency control, and so on. For example in volume control, the controller 207 may be used for controlling the amplitude of the audio signal AUD1 in the internal circuit or the controller 207 may be used for controlling the wireless signal corresponding to the audio signal AUD1. Thus, user can control the volume when the audio player plays the audio signal AUD1. Moreover, for example in frequency control, the controller 207 is used for tuning the frequency band for demodulation of the wireless receiver 202 to improve frequency matching between the external wireless audio provider and the wireless receiver.

Figure 3:
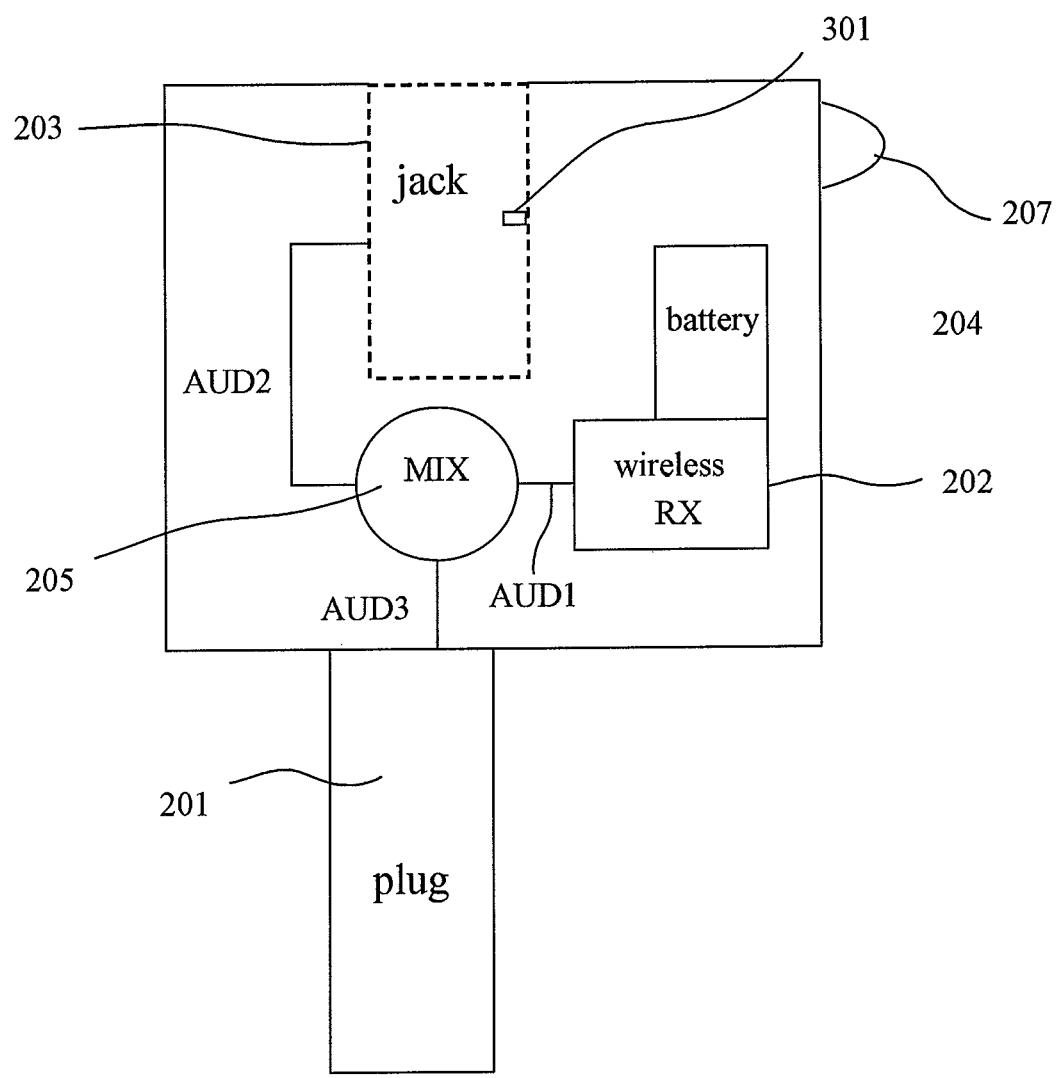
FIG. 3 illustrates a circuit block diagram depicting an expandable device for wireless audio input according to a preferred embodiment of the present invention.

FIG. 3 illustrates a circuit block diagram depicting an expandable device for wireless audio input according to a preferred embodiment of the present invention. Referring to FIG. 2 and FIG. 3, the difference between the expandable device for wireless audio input in FIG. 3 and the expandable device for wireless audio input in FIG. 2 is that the switching circuit 301 is designed in the audio jack 203. When an audio jack plug inserts to the audio jack 203, the switching circuit 301 is turned on automatically. At this time, the mixer 205 is enabled for performing an audio mixing for the audio signals AUD1 and AUD2.

In summary, the spirit of the present invention is to provide an extra audio jack on the expandable device for wireless audio input to expand the audio jack of the audio player. Thus, when another device needs to use the audio jack to input an audio to the audio player, the device still can use the audio jack on the expandable device for audio input. Accordingly, expandable device for wireless audio input can be used for unlimitedly expanding the audio input. In other words, if there is a plurality of expandable devices, they can serially connect to the audio player, and the number of the audio jack of the audio player does not need be taken into account.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An expandable device for wireless audio input, for outputting an audio signal to an audio output device, wherein the audio output device comprises a first audio jack, and the expandable device for wireless audio input comprises:
   a first audio jack plug, for outputting a first audio signal;
   a wireless receiver, coupled to the first audio jack plug, for converting a wireless signal into the first audio signal, and transmitting the first audio signal to the first audio jack plug; and
   a second audio jack, coupled to the first audio jack plug, wherein, when a second audio signal is input from the second audio jack, the second audio jack provides the second audio signal to the first audio jack plug;

wherein the expandable device for wireless audio input is compatible with an audio provider, and the audio provider is used for converting an audio into the wireless signal, and transmitting the wireless signal to the wireless receiver, wherein, the expandable device for wireless audio input further comprises:

a mixer, coupled to the first audio jack plug, the wireless receiver and the second audio jack, for mixing the second audio signal input from the second audio jack and the first audio signal from the wireless receiver; and a switching circuit, coupled to the mixer, wherein the mixer is enabled when the switching circuit is turned on, and the mixer is disabled when the switching circuit is turned off.

2. The expandable device for wireless audio input according to claim 1, wherein the audio provider comprises:

an electronic musical instrument, wherein, when a user plays the electronic musical instrument, the electronic musical instrument converts a music which user plays into a electrical signal, and converts the electrical signal into the wireless signal.

3. The expandable device for wireless audio input according to claim 1, wherein the audio provider comprises:

a wireless microphone, wherein, when the wireless microphone receives an audio, the wireless microphone converts the received audio into the wireless signal.

4. The expandable device for wireless audio input according to claim 1, wherein the switching circuit is turned on when a second audio jack plug is inserted to the second audio jack.

5. The expandable device for wireless audio input according to claim 1, further comprising a battery for providing a power to the wireless receiver.

6. The expandable device for wireless audio input according to claim 1, further comprising a volume controller for adjusting amplitude of the first audio signal.

7. The expandable device for wireless audio input according to claim 1, further comprising a channel controller for adjusting a band of the wireless receiver for demodulation.

* * * * *